United States Patent [19]

Miller et al.

[11] 4,031,285

[45] June 21, 1977

[54] LIGHTWEIGHT, REINFORCED FOAMED ORGANIC POLYMER AND CEMENTITIOUS MATERIAL STRUCTURE

[76] Inventors: Charles H. Miller, 54-065 Avenida Carranza, La Quinta, Calif. 92253; Jose A. Mayrl, Centenario 1222 San Pedro Garza Garcia, N. Leon, Mexico

[22] Filed: Dec. 16, 1974

[21] Appl. No.: 532,974

Related U.S. Application Data

[62] Division of Ser. No. 191,276, Oct. 21, 1971, Pat. No. 3,878,278.

[52] U.S. Cl. .............................. 428/294; 428/119; 428/120; 428/295; 428/310; 428/315; 428/317; 428/327
[51] Int. Cl.² .......................................... B32B 3/26
[58] Field of Search .......... 428/119, 120, 294, 327, 428/537, 295, 310, 315, 317; 52/223 R, 309, 600, 615

[56] References Cited

UNITED STATES PATENTS

| | | | |
|---|---|---|---|
| 492,849 | 3/1893 | Strippgen | 52/600 |
| 1,386,554 | 8/1921 | Dalglish | 52/600 |
| 3,070,475 | 12/1962 | Carlson, Jr. et al. | 428/119 |
| 3,247,294 | 4/1966 | Sabouni | 52/223 R |
| 3,284,980 | 11/1966 | Dinkel | 52/600 |
| 3,331,174 | 7/1967 | Wesch et al. | 52/615 |
| 3,484,331 | 12/1969 | Betz | 428/120 |
| 3,630,820 | 12/1971 | Leach | 428/327 |
| 3,791,912 | 2/1974 | Allard | 428/294 |

*Primary Examiner*—Marion E. McCamish
*Attorney, Agent, or Firm*—Nilsson, Robbins, Dalgarn & Berliner

[57] ABSTRACT

A lightweight, reinforced structural material, having low density and high flexure and compression strengths, is prepared by combining together inorganic cementitious material and organic polymer-forming material to form a mixture and forming the mixture into a slab while embedding an elongate reinforcing members which are relatively rigid in the depth dimension of the slab. Polymerization and setting of the material tensions the reinforcing members.

14 Claims, 5 Drawing Figures

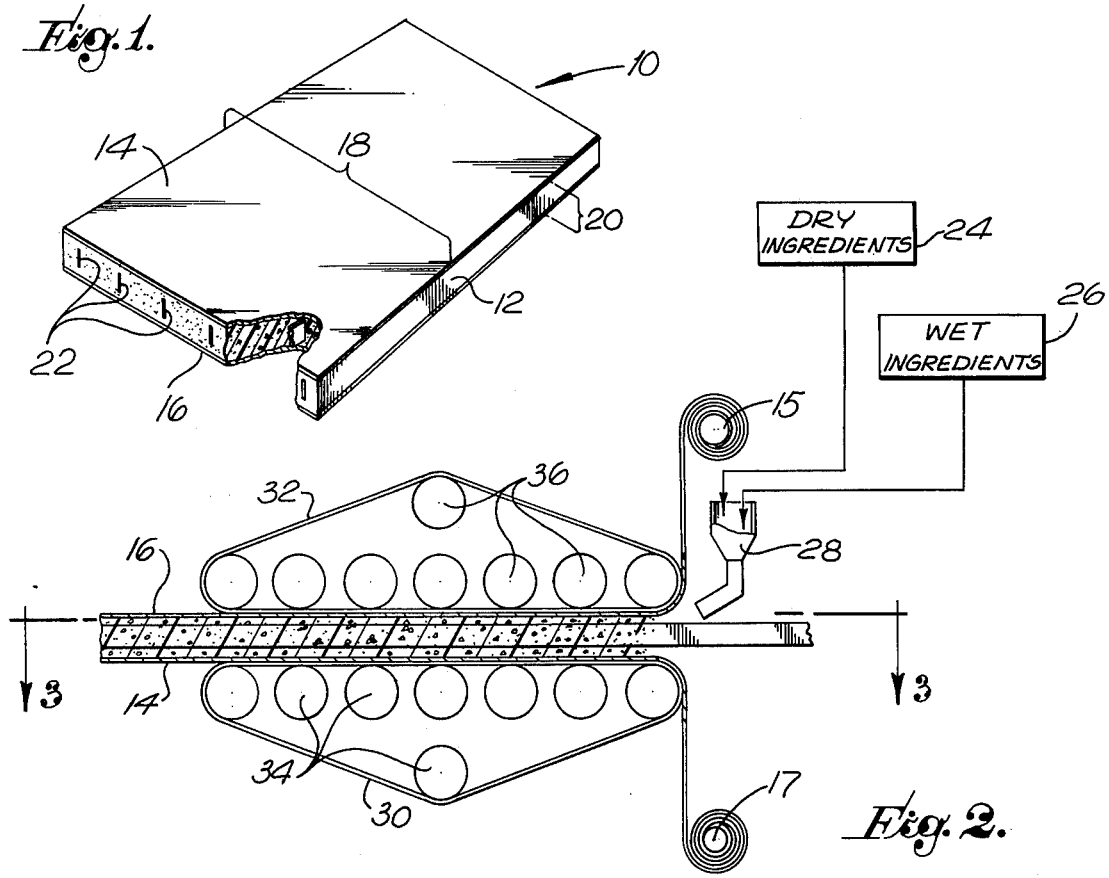
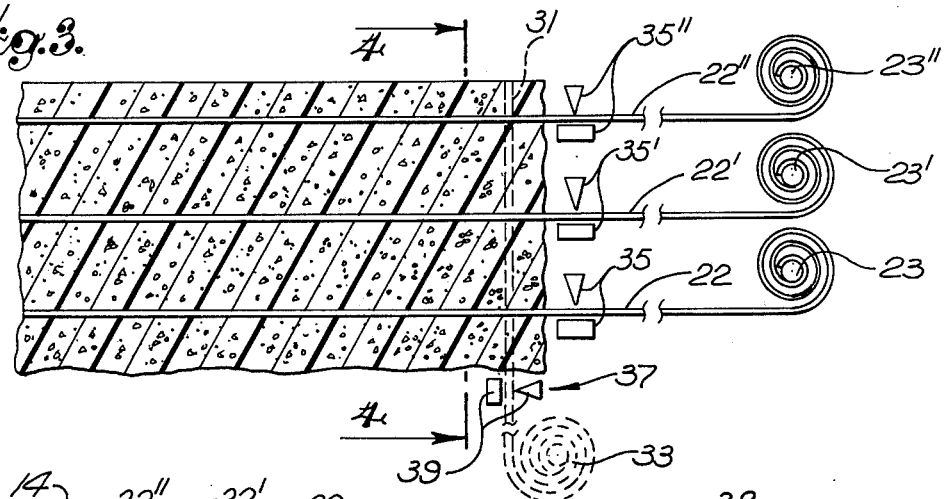
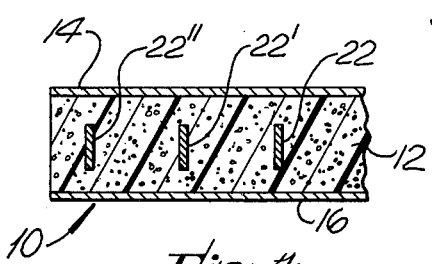
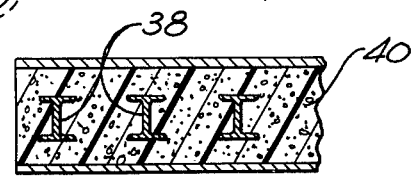

LIGHTWEIGHT, REINFORCED FOAMED ORGANIC POLYMER AND CEMENTITIOUS MATERIAL STRUCTURE

This is a division of application Ser. No. 191,276 filed Oct. 21, 1971 now U.S. Pat. No. 3,878,278.

FIELD OF THE INVENTION

The fields of art to which the invention pertains include the fields of building materials and methods of forming the same, particularly with respect to cementitious materials and cementitious-polymer materials.

BACKGROUND AND SUMMARY OF THE INVENTION

An object of the present invention is to provide a structural material in the form of a plaster board or the like which is of lower density than generally available yet which has advantageous strength characteristics, particularly with respect to flexure, compression and deflection resistance, and having advantageous sound absorbing and fire resistant properties. A variety of methods have been previously utilized to obtain low density structural material and these efforts have generally been directed toward the formation of cementitious foams and the production of cellular gypsum products. The basis of formation of such materials has generally been the generation or liberation of gases within the cementitious mass by the addition of chemical ingredients reacting in the presence of water. The gas spreads through the mass to form a cellular structure when the cementitious material has set and hardened. Such common gas producing ingredients as aluminum sulfate, alkali carbonates and hydrogen peroxide have been used for this purpose. See for example U.S. Pat. No. Re. 19,506 to Adolph, U.S. Pat. Nos. 2,235,008 to Brownmiller, 2,898,220 to Ulfstedt et al., 2,371,928 to Schneider, 1,946,077 to Kauffmann and 1,620,067 to Brookby et al. Other efforts have been directed toward incorporating a synthetic foaming material such as an organic polymer foam and reference can be made to U.S. Pat. Nos. 2,640,191 to McKee, 2,311,233 to Jaenicke et al. and 2,064,800 to Kauffmann et al. and British Pat. No. 263,571 to Rice. Other references of interest are U.S. Pat. Nos. 3,056,184 to Blaha and 2,676,892 to McLaughlin, Australian Pat. No. 230,162 to Vieli, British Pat. No. 571,284 to Mottershaw and Canadian Pat. No. 521,144 to Sterling. While low density materials have been prepared by methods of some of the foregoing disclosures, they generally lack the strength characteristics required for direct use of such material as wall structures and the like in the building trades. In an effort to overcome these deficiencies it has been suggested to incorporate various fibrous materials in some of the foregoing type of structures. See for example U.S. Pat. Nos. 2,064,800 to Kafuumann et al. (fibrous pulp), 1,808,571 to Raynes (reinforcing strips of heavy paper in cementitious material) and 1,798,609 to Knowlton (reinforcing strips in plaster board). Also of interest are U.S. Pat. No. 1,793,634 to Plunkett (plaster backing sheet incorporating wire mesh) and U.S. Pat. No. 2,664,406 to Armstrong (fissured tile of gypsum cement, amine-aldehyde resin and glass fibers). U.S. Pat. No. 3,062,682 to Morgan et al. is of some interest in disclosing the incorporating of glass fibers in a foamable binder such as a synthetic resin material or a cementitious material.

The present invention provides a reinforced structural material which is of lower density than generally utilized in the building trades but which has high flexure and compression strengths, which resists deflection and has desirable sound absorbing and fire resisting properties. With higher density material (e.g., aluminate) the modulus of rupture can be as high as 300 lbs/in$^2$ and compression resistance can be as high as 1000 lbs/in$^2$. The structure consists of polymer modified cementitious foam in which elongate reinforcing members are disposed intimately joined under tension to the structure. The cementitious material sets to form a rigid matrix through which a foamed organic polymer is dispersed. As the plaster sets and the polymer foams, elongate reinforcing members are embedded in the mass and are securely gripped by the rigidifying mass.

In the illustrated embodiment, a mixture of the foaming polymer and cementitious material is advanced to a setting station with the elongate reinforcing member embedded therein fed from a supply, resulting in a tensioning of the reinforcing member and rigid securement in the final slab product. A plurality of the reinforcing members are embedded in the slab spaced along the width dimension of the slab, the elongate members having a greater rigidity in the depth dimension than in the width dimension of the slab. Load testing indicates that the slabs so produced are more polymer foam-like in their flexure properties than plastic-like. The slab can be deflected without cracking over distances greatly in excess of deflections obtainable with plaster board and takes a deflection set in the manner of plastic. Furthermore, the rigid securement of the reinforcing members results in a synergistic increase in deflection resistance, values being obtained which are greatly in excess of the sum of deflection values obtained for the slab without reinforcement and for the reinforcement members. The cellular matrix configuration of the slab structure provides sound absorbing and fire and heat resisting properties superior to the structures in general building use.

BRIEF DESCRIPTION OF THE DRAWINGS

FIG. 1 is a perspective, partially cut-away view of a portion of a structural member formed in accordance with the present invention;

FIG. 2 is a diagrammatic view of one form of apparatus for making the present structures;

FIG. 3 is a cross-sectional view, partially diagrammatical, of the cementious structure, taken on line 3—3 of FIG. 2, in the direction of the arrows;

FIG. 4 is a sectional view of the cementitious structure taken on line 4—4 of FIG. 3, in the direction of the arrows; and FIG. 5 is a cross-sectional, partial view of a cementitious structure incorporating an alternative form of reinforcing member.

DETAILED DESCRIPTION

Referring to FIG. 1, there is illustrated a plaster board 10 of the present construction in which a foamed polymer is dispersed throughout a cementitious matrix forming a slab 12 of structural material sandwiched between paper cover sheets 14 and 16. The slab 12 has a greater width dimension 18 than depth dimension 20 and has a length in accordance with the sizing of the board as desired. Typically, boards produced herein will have a depth of from about ¼ inch to about 6 inches, with a depth of from about 2—3 inches being more commonly useful, a width of about 3 feet and a length of about 8 feet. The foregoing dimensions are common and convenient, any dimension as desired being generally obtainable with appropriately configurated forming machines. The slab can be cut up into any size as desired. Two inch slabs can be used as interior walls, floors and ceilings without need for 2 × 4 supports. The structural integrity of the slab allows most building codes to be met in a simpler, more facile fashion than heretobefore available.

Embedded in the slab 12 are a plurality of steel bands or ribbons 22 disposed perpendicularly with respect to the cover sheets 14 and 16 and spaced from the outer edges of the slab 12. By this disposition the steel bands have greater rigidity in the depth dimension 20 of the slab than in is width dimension and serve to resist compression, flexure and deflection forces. As will be brought out below in more detail, the reinforcement imparted by the steel bands 22 in conjunction with the cementitious-polymer foam matrix results in synergistic increase the deflection resistance.

Referring to both FIGS. 2 and 3, a mechanism for forming the slab 12 is schematically illustrated. Dry components 24 comprising cementitious material, accelerator therefore, and catalyst for the polymer former, are intimately mixed together. Wet components 26, comprising polymer-former, foaming agent and water, are intimately mixed together separate from the dry components 24. The dry and wet compounds 24 and 26 are then added to a high speed continuous flash mixer 28 which dispenses the mixed components between bottom and top cover sheets 16 and 14, respectively, fed from supplies 15 and 17. The mixed mass and sandwiching sheets 16 and 14 are moved past the mixer 28 by oppositely disposed endless belts 30 and 32 carried on rotating roller sets 34 and 36. The rate of feed from the mixer 28 and spacing between the belts 30 and 32 are adjusted to provide the desired depth of the resultant slab. To produce a continuous, self-supporting slab utilizing accelerated, quick-set cementitious material, a contact length of the endless belt of about 10 feet is sufficient. The cover sheets 14 and 16 may be omitted to form a bare slab 12, the mixture being carried directly by the belts 30 and 32.

Simultaneously with the feeding of the cementitious-polymer-forming mixture, a plurality of steel bands 22, 22' and 22'' are fed from supplies 23, 23' and 23'' thereof into engagement with the cementitious mass. As the mixture of cementitious material and polymer-forming material leaves the mixture, the cementitious material immediately starts to foam and, being accelerated, starts to quickly set. Simultaneously, the catalyst for the polymer former dissolves into the wet components 26 and starts to catalyze the polymer-former Polymer forms and expands, and acting in conjunction with the foamed cementitious material, grips the surfaces of the embedded steel bands 22, 22' and 22'' firmly securing the bands within the setting mass. The cementitious material appears to set before the polymer foam and holds its shape while the polymer foam sets. Restraint on the steel band supply can be provided by brakes therein, generally of several pounds, which results in tensioning of the steel bands against this restraint so that the resultant slab 12 is formed with rigidly secured, tensioning steel bands as reinforcing members. The mass is sufficiently set as it leaves the ends of the endless belts 30 and 32 as to be self-standing. Further curing and setting of the material can take place elsewhere if necessary; however, the nature of the components are such that no kilning is necessary.

Referring to FIG. 4, a cross-sectional view of the resulting slab 12 is illustrated. The slab 12 is formed with uniform characteristics throughout and has desirable strength, sound absorbing and fire resistant qualities as will be detailed hereinafter. The steel bands 22, 22' and 22'' are disposed entirely within the slab 12 with its edges spaced about 1/16 to about 1 inch, preferably about ¼ – ½ inch, from the surfaces of the slab 12. With the slab depth range above referred to of about ¼ – 6 inches, a band width of about 1/16 inch to about 5½ inches can be utilized. Typically, in a 2 inch deep slab one can utilize ribbon steel 0.02 inch × 0.5 inch in dimension. A spacing of about 2–8 inches between the bands is generally suitable, about 5 inches being preferable. As a result of the aforementioned gripping action, when the slab is ruptured it is found that the band doesn't turn but is cut as if with a scissors.

There is also illustrated in FIG. 3 a further embodiment of the invention wherein a reinforcing member, such as a steel band 31 is fed transversely to the bands 22, 22' and 22'', and perpendicular to the cover sheets 14 and 16. In this case, the bands 22, 22' and 22'' are cut by means of cutting stations shown diagrammatically at 35, 35' and 35''. The advancing endless belts 30 and 32 are stopped after the bands 22, 22' and 22'' have advanced past a transverse insertion station 37. At that station, the transverse band 31 is inserted from its supply 33 and cut by a mechanism shown diagrammatically at 39. The transverse bands such as at 31 can be disposed at any desired spacing along the length of the slab 12 to impart additional compression, flexure and deflection values. Spacing can be similar to the spacing between the bands 22, 22' and 22''. Alternatively, short lengths of transverse bands can simply be inserted from the top between the bands 22, 22' and 22'', or on top thereof facilitated by notches in the bands 22, 22' and 22'' or by spacing thereof sufficiently deep within the slab mixture.

In place of the steel bands, one can utilize similar ribbons constucted of fiberglass, rigid plastic, glass, nylon, or the like. Furthermore, one can utilize other configurations for the reinforcing member, such as a plurality of filaments, e.g., 20–100 glass fiber filaments, nylon cord which may be both mono- and poly-filaments and the like. Referring to FIG. 5, an alternative embodiment is illustrated wherein steel bands 38 are formed with I shaped-cross sections. Such bands provide for greater gripping action by the cementitious polymer foams constituting the slab 40. Other configurations for the reinforcing member can also be utilized.

The cementitious polymer foam mixture is formed basically from a cementitious material and a polymer former which are both foamable. The techniques for foaming these materials are well known as illustrated by the above reference patents. Polymer formers which are self-foamable can be used or the matrix formed by the foamed cementitious material can be used to foam otherwise non-foamable polymer-formers. In addition to these basic components one can add a setting accelerator for the cementitious material, a foaming agent for the polymer and a foaming agent for the cementitious material. The latter component can advantageously be a peroxide and a peroxide reducing agent may be included to facilitate its action. Additionally, a small amount of cellulose fiber can be added to aid in achieving uniform consistency. Water of course, is present and generally the more water present the higher the foam.

As cementitious material one can use any inorganic binder material which is cementitious in nature such as gypsum cement (including foams such as beta and alpha gypsum), Portland cement (including any of the Types I-V), magnesium oxysulfate, magnesium oxychloride, zinc oxysulfate, zinc oxychloride, magnesium oxyphosphate, zinc oxyphosphate, alumnite cement, metal silicates such as calcium silicate and aluminum silicate, pozzolanic cements, and colloidal silicic acid. Gypsum cement ($CaSO_4 \cdot 0.5 H_2O$) is a preferred material most readily providing the desired foamability, density, strength, and sound absorbing and fire resisting properties.

As the organic foamable polymer former, one can use materials which themselves are foamable such as polyurethane foam or thermosetting or thermoplastic material which can be mixed with foaming agents therefore. Polyurethane foams are produced from a polyester and isocyanate with an amine accelerator. In the presence of water it begins foaming shortly after the constituents are brought together. Thermosetting polymers include amino resins including the urea-aldehydes such as urea formaldehyde and melaminealdehydes, phenolic resins such as phenol- or substituted phenolaldehydes, polyesters, epoxy resin, polyethylene oxide, phenoxy resins, polyphenylene oxide resins, polyoxymethylene, silicone resins such as polydimethylsilicone, furfural, gelatin formaldehydes, and the like. Examples of thermoplastic polymer formers include polyvinyl alcohol, polyvinyl acetate, polyvinyl acetals, polyvinyl ethers, polyvinyl chloride, polyvinyl butyral, polyethylene, polystyrene, polyamides, counaroneindenes, polyvinylidene chloride, cellulose derivatives such as cellulose nitrate and ethyl cellulose, alkyds, acrylics such as polymethacrylate, polyethylmethacrylate, methyl chloroacrylate, cyclohexylmethacrylate and polymethyl-2-cyanoacrylate, cellulose acetobutyrate, and the like. In the addition to the foregoing synthetic resinous materials, various elastomeric materials can also be used, for example, natural rubber, polychloroprene, polybutadiene, polybutene, styrenebutadiene copolymers, butadiene-acrylonitrile copolymers, polysulfide elastomers, and the like. In addition, one can use various synthetic and naturally occurring polymers such as albumen, casein, carboxymethyl cellulose, polyvinyl-pyrolidone, and the like. For other polymers, and for specific utilization of the foregoing, reference can be made to the Handbook of Foam Plastics by Rene J. Bender, Lake Publishing Corporation, Libertyville, Illinois (1956), Modern Plastics Encyclopedia, McGraw-Hill, Inc. (1968) and the Encyclopedia of Polymer Science and Technology, Interscience Publishers, New York (1970), each being incorporated herein by reference.

Urea-aldehydes such as urea formaldehyde, and acrylics such as methylmethacrylate, are particularly suited for use in the present process. With urea-aldehydes, suitable catalyzing agents are generally acidic and can be selected from mineral acids of the hydrochloric acid and sulfuric acid type or acid salts such as ammonium chloride, stannic chloride, zinc chloride, iron chloride, aluminum trichloride, ammonium sulfate, aluminum sulfate, and the like.

Generally, the polymer-former is used in its monomeric state, but can be used when it is somewhat polymerized but not fully cross-linked. Mixtures of polymers, partial polymers and/or monomers, as well as copolymers, can be utilized. The polymer former can be mixed together with the water and foaming agent for the cementitious material prior to being combined with the dry ingredients which contain any foaming agent for the polymer former as needed.

As foaming agent for the polymer-former, one can use any material which will evolve gas when brought into contact with the polymer former or water. Examples of such materials are aluminum sulfate (which also acts as an accelerator for the cementitious material when in contact with water, ammonium chloride, sulfamic acid, ammonium carbonate, sodium bicarbonate, potassium, sodium and ammonium salts of rosins and the sodium, potassium and ammonium salts of alkyd sulfonic acids or sulfates, dinitroso-pentamethylenetetramine, N, n'-dimethyl, N, n'-dimethyl N,N'-dinitrosoterephthalamide, p, p' oxy bis (benzene sulfonyl hydrazide), and the like. Amounts up to about 2 percent by weight (based on the cemetitious-polymer-former mixture) can be used, a suitable range being about 0.1–2%.

The components are mixed so that there is present about 50–80% of cementitious material and about 1–10% of polymer-former, the remainder of the mixture comprising water and the various accelerating, catalyzing and filling components as above described. When cellulose fiber is utilized it is present in amounts ranging up to about 2% by weight, a convenient range being 0.2–2%.

When the polymer former contains gas evolving components, or when a separate foaming agent for the polymer former is used, these components can be used for foaming the cementitious material as well; however, it is preferred to have a separate foaming agent for the cementitious material. Peroxides can be used for this purpose and examples are hydrogen peroxide, alkaline earth metal peroxide such as calcium peroxide, barium peroxide, magnesium peroxide and strontium peroxide, and alkali metal peroxides such as sodium peroxide and potassium peroxide. Up to about 4 weight percent, based on an equivalency of hydrogen peroxide, is generally sufficient and a useful range is about 0.1–4 weight percent on that basis. By utilizing an alkali metal peroxide or alkali earth metal oxide and polymer-former in dry form, all the ingredients except water can be premixed and then used simply by adding water.

When hydrogen peroxide is used, a catalyzer therefor can be included, its purpose being to react with the hydrogen peroxide to accelerate the liberation of oxygen. Such materials are well known and include manganese dioxide, calcium oxide, blood flour, hypochlorite, manganese sulfate, and the like. The catalyzer can generally be present in amounts up to about 2% and a suitable range is about 0.1–2%.

Agents for accelerating the setting of the cementitious material are well known. Examples include aluminum sulfate, magnesium sulfate, ammonium chloride and sodium chloride. Generally up to about 2% by weight is satisfactory and a suitable range is about 0.1–2%.

The following examples, in which all parts are by weight, will illustrate various aspects of the invention.

EXAMPLE 1

Dry ingredients were prepared by intimately mixing 100 parts of gypsum cement ($CaSO_4 \cdot 0.5 H_2O$), 0.125 parts of manganese dioxide and 0.5 parts of aluminum sulfate. Wet ingredients were prepared by intimately mixing 1.5 parts of urea formaldehyde (American Cyanamide No. 180 Liquid), 1.5 parts of a 35 weight percent hydrogen peroxide solution and 45.0 parts of water. Following the procedure referred to in the main embodiment illustrated in FIGS. 2 and 3, the dry and wet ingredients were mixed together in the high speed continuous mixer, while 0.020 inch × 0.5 ribbon steel reinforcing members were fed into the forming mass. The mass was formed into a board 2 feet wide and 2 feet long and having a depth of 2 inches with the steel bands spaced 5 inches apart, the edges being ½ inch from the top and bottom sides of the resultant slab. The slab was allowed to set for about 24 hours and thereafter found to have a Modulus rupture of 296 psi, an "apparent" Young's Modulus of $8.9 \times 10^4$ psi, an EI factor (a factor indicating stiffness) of $8.0 \times 10^5$ psi, and a density of about 30 lbs/ft³. The board was subjected to a vibration test in which it was vibrated at from 20 to 16,000 cycles per second while being scanned with 110 decibels over a period of 10 minutes. No cracking or spalling was noted. A sample was cut from the board, excluding the metal ribbon bands, having 2 inch length and 2 inch width dimensions and subjected to a compression test in which the sample is compressed between appropriately disposed platens under increasing measured pressure until it cracks. It was found to have a compression resistance of 445 psi.

EXAMPLE 2

Three bare slabs were prepared as in Example 1, each having widths of 13 inches, lengths of 50 inches and depths of 2 inches. The slabs were loaded on 4 inch diameter parallel steel dowels which were spaced 42 inches on their centers. The slabs were then loaded with continuous layers of 2 kilogram, 1 kilogram or 1 milligram flat shot bags. Between each layer of shot bags was placed a sheet of 0.002 ½ hard 1030 stainless steel. Loading was continued with the shot bags until the center of the slab deflected approximately 1 inch. The three slabs deflected as follows:

| Specimen | Deflection | Load |
| --- | --- | --- |
| 1 | 1.017 inch | 185 kilograms |
| 2 | 0.973 inch | 180 kilograms |
| 3 | 0.980 inch | 180 kilograms |

Averaging the foregoing figures it is seen that a slab as provided in Example 1 has a deflection of about 1 inch under a load of about 182 kilograms (400 lbs.)

Similar tests were conducted on the steel band alone and it was found that the band had a deflection of about 1 inch under a load of 32 kilograms (70 lbs.).

Three bare slabs were prepared in accordance with the procedure of Example 1 except that the steel bands were omitted. The slabs were subjected to the identical deflection test with the following results:

| Specimen | Deflection | Load |
| --- | --- | --- |
| 4 | 1.06 inch | 57 kilograms |
| 5 | 1.01 inch | 54 kilograms |
| 6 | 1.02 inch | 55 kilograms |

Averaging the foregoing values we see that the unreinforced slab deflected about 1.03 inch under a load of about 55.3 kilograms (122 lbs.).

Comparing the results, one would expect that the reinforced slab would have a deflection of 1 inch under a load of about 87 kilograms (32 kilograms plus 55 kilograms), but in fact the load required was 182 kilograms, evidencing a synergistic cooperation between the components.

EXAMPLE 3

A board prepared in accordance with Example 1, except that the steel ribbon bands were omitted, was subjected to a thermal conductivity test, ASTM C174-45 and found to have K factor and U factor thermal conductivities of 0.72 and 0.36, respectively.

EXAMPLE 4

A slab prepared in accordance with Example 3 was subjected to a sound absorbtion test wherein it was found that the slab absorbed 70 decibels of sound impinging thereon at a frequency of 4000 cycles per second.

EXAMPLE 5

A board was prepared as in Example 3 utilizing as dry ingredients 27.9 parts of gypsum cement, 0.26 parts of cellulose fiber (chopped paper) and 0.14 parts of manganese dioxide. The wet ingredients were formed by mixing 1.30 parts of an acrylic emulsion (Rohm and Haas AC-35) and 0.48 parts of 35 weight percent solution of hydrogen peroxide in 15.75 parts of water.

The resultant slab was tested for compression resistance in accordance with the procedure described in Example 1 and found to resist a stress of 175 psi.

A portion of the slab measuring 3 inches in width and 8 inches in length was subjected to a flexure test wherein a 6 inch span of the slab was suspended between supports and covered with a very thin, flexible steel sheet for load distribution. Weights were added to the center of the sheet until breakage. The slab was found to resist an average weight of 179 lbs for a modulus of rupture of 135 psi. The density of the slab was determined to be 28.6 lbs/ft³.

EXAMPLE 6

A slab was formed as in Example 5 but 3 inches thick and found to have a density of 28.6 lbs/ft³. A portion of the slab measuring 4.5 inches in width and 5.5 inches in length was subjected to a fire test in which one surface was exposed to a furnace which was increased in temperature from 72° F to 1000° F in 5 minutes and thereafter to 1850° F in 2 hours. The specimen was then subjected to the 1850° F temperature for an additional 2 hours. The temperature of the opposite surface was monitored and was found to increase from 72° F (room temperature) to 296° F over the 4 hour period, showing a temperature change of only 224° F.

Thereafter, the specimen was subjected to a water test wherein water under a pressure of 30 psi was applied to the heated surface for 2.5 minutes and no water penetration was noted.

EXAMPLE 7

A slab was prepared following the general procedure of FIGS. 2 and 3 but in which the components, except water were all premixed. 20.3 parts of gypsum cement were mixed with 0.37 part of cellulose fibers, 0.20 part of urea formaldehyde (American Cyanamide No. 110 Dry Powder), 0.059 part of sulfamic acid and 0.14 part of calcium peroxide. To this mixture was added 12.5 parts of water and a slab was formed.

The density of the slab was determined to be 41.9 lbs/ft$^3$. A portion of the slab was subjected to the compression test described in Example 1 and was found to withstand 471 psi. Another portion of the slab was subjected to the flexure test as described in Example 5 and found to withstand 158 psi.

In general, the slabs produced in accordance with the present invention have a density of about 20–60 lbs/ft$^3$, a modulus of rupture of about 100–300 lbs/in$^2$, a compression resistance of about 125–1000 lbs/in$^2$ and, for a 2 inch thick slab of about 13 inches width, a deflection of about 1 inch over a span of 42 inches under a uniform beam load of about 250–450 lbs, or equivalent.

We claim:

1. A lightweight reinforced structure having a substantial length dimension and greater width dimension than depth dimension,
   comprising; a mixture obtained as a result of foaming organic polymer material insitu throughout cementitious material; and
   at least one elongate reinforcing member embedded in said mixture intimately joined thereto under tension and gripped by said material substantially along its entire length, said elongate member being elongate in said length direction and relatively rigid in the depth dimension of said mixture.

2. The structure of claim 1 in which said elongate member is one of a plurality of elongate members embedded in said formed material, said elongate members being spaced along the width dimension of said formed material.

3. The structure of claim 1 in which said elongate member has greater rigidity in the depth dimension of said formed material.

4. The structure of claim 1 in which said elongate member is one of a plurality of elongate members embedded in said formed material, said elongate member being spaced along the width dimension of said slab, each elongate member having greater rigidity in the depth dimension than in the width dimension of said formed material.

5. The structure of claim 1 including at least one elongate reinforcing member embedded in said formed material transverse to said first mentioned elongate member.

6. The structure of claim 1 including a covering of paper adhered to each side along the length and width dimensions of said formed material.

7. The structure of claim 1 in which said elongate member comprises a ribbon of steel.

8. The structure of claim 1 in which said elongate member has an I cross-section shape.

9. The structure of claim 1 in which said inorganic cementitious material comprises gypsum cement.

10. The structure of claim 9 in which the amount of said foamed organic polymer dispersed throughout said cementitious material is about 1% to about 5%.

11. The structure of claim 10 in which said structure has a density of about 20–60 lbs/ft$^3$, a modulus of rupture of at least 100 lbs/in$^2$, a compression resistance of at least 125 lbs/in$^2$ and, for a 2 inch thick structure of about 13 inches width, a deflection of about 1 inch over a span of 42 inches under a load of at least 250 lbs., or equivalent.

12. The structure of claim 1 in which said foamed organic polymer material comprises a urea-formaldehyde.

13. The structure of claim 1 in which said foamed organic polymer material comprises an acrylic.

14. The structure of claim 1 in which said structure includes cellulose fiber dispersed therethrough.

* * * * *

UNITED STATES PATENT AND TRADEMARK OFFICE
CERTIFICATE OF CORRECTION

PATENT NO. : 4,031,285

DATED : June 21, 1977

INVENTOR(S) : Charles H. Miller and Jose A. Mayrl

It is certified that error appears in the above-identified patent and that said Letters Patent are hereby corrected as shown below:

Col. 1, line 42, "2,640,191" should be --2,240,191--.

Col. 3, line 29, "compounds" should be --components--.

Col. 3, line 65, "tensioning" should be --tensioned--.

Col. 5, line 5, "foams" should be --forms--.

Signed and Sealed this

Twenty-ninth Day of November 1977

[SEAL]

Attest:

RUTH C. MASON
*Attesting Officer*

LUTRELLE F. PARKER
*Acting Commissioner of Patents and Trademarks*